United States Patent [19]

Murching

[11] Patent Number: 5,651,930
[45] Date of Patent: Jul. 29, 1997

[54] COMPOSITE FIBER ROTOR VANE

[75] Inventor: Nagendra N. Murching, Decatur, Ill.

[73] Assignee: Zexel USA Corporation, Decatur, Ill.

[21] Appl. No.: 548,107

[22] Filed: Oct. 25, 1995

[51] Int. Cl.$^6$ .............. B29C 43/02; B29C 43/54
[52] U.S. Cl. .............. 264/108; 264/257; 264/322; 264/325
[58] Field of Search .................. 264/108, 257, 264/258, 320, 322, 325

[56] References Cited

U.S. PATENT DOCUMENTS

| Re. 33,919 | 5/1992 | Kristoff et al. . | |
|---|---|---|---|
| 1,943,561 | 1/1934 | Staley . | |
| 2,949,054 | 8/1960 | White | 264/108 |
| 3,417,664 | 12/1968 | Brucker . | |
| 3,512,908 | 5/1970 | Smith . | |
| 3,790,317 | 2/1974 | Hyde et al. . | |
| 3,966,523 | 6/1976 | Jakobsen et al. | 264/258 |
| 4,209,286 | 6/1980 | Schwartz . | |
| 4,548,678 | 10/1985 | Laflin et al. . | |
| 4,636,422 | 1/1987 | Harris et al. | 264/257 |
| 4,804,317 | 2/1989 | Smart et al. . | |
| 4,950,532 | 8/1990 | Das et al. | 264/257 |
| 5,219,461 | 6/1993 | Hyll et al. | 264/257 |
| 5,227,113 | 7/1993 | Hamabe et al. | 264/258 |
| 5,273,401 | 12/1993 | Griffin | 418/193 R |
| 5,364,235 | 11/1994 | Bearint . | |

*Primary Examiner*—Jeffery R. Thurlow
*Attorney, Agent, or Firm*—James E. Bradley

[57] ABSTRACT

A rotor vane and a method for fabricating the rotor vane are provided in which the vane is formed of a thermoplastic matrix material having chopped fibers uniformly dispersed throughout the thermoplastic material, with the fibers aligned to extend in directions which are approximately parallel to a radial dimension in which the vane extends. A billet formed of the thermoplastic matrix material with the chopped fibers randomly oriented and uniformly dispersed within the thermoplastic matrix material is placed in vane forming dies. The dies have an interior surface which is in the shape of the vane. The billet is placed within the dies with the longitudinal length of the billet extending perpendicular to the radial dimension of the vane being formed and completely across the axial dimension of the vane being formed. The billet is heated to a softening temperature and compressed within the dies to deform the billet into the shape of the interior surface of the dies, causing the thermoplastic matrix material to flow in flow directions which are approximately parallel to radial dimension of the vane being formed. Flowing of the thermoplastic matrix material in the flow directions aligns a substantial portion of the fibers with the flow directions, approximately parallel to the radial dimension of the vane. Then the thermoplastic matrix material is cooled to temperature below the softening temperature and the vane is removed from the dies.

11 Claims, 3 Drawing Sheets

| PROVIDE BILLET FORMED OF THERMOPLASTIC MATRIX MATERIAL WITH CHOPPED FIBERS UNIFORMLY DISPERSED AND RANDOMLY ORIENTED THROUGHOUT THERMOPLASTIC MATRIX MATERIAL | 81 |

↓

| PLACE BILLET INTO FORMING DIES WITH LONGITUDINAL LENGTH OF BILLET EXTENDING WITHIN DIE IN DIRECTION IN WHICH AXIAL DIMENSION OF VANE WILL EXTEND UPON FORMING VANE | 83 |

↓

| HEAT BILLET TO SOFTENING TEMPERATURE WITHIN PLASTIC TEMPERATURE REGION FOR THERMOPLASTIC MATRIX MATERIAL | 85 |

↓

| COMPRESS BILLET WITHIN FORMING DIES TO FLOW THERMOPLASTIC MATRIX MATERIAL IN DIRECTIONS SUBSTANTIALLY PARALLEL TO RADIAL DIMENSION OF VANE BEING FORMED | 87 |

↓

| COOL VANE | 89 |

↓

| REMOVE VANE FROM FORMING DIES | 91 |

COMPOSITE FIBER ROTOR VANE

BACKGROUND OF THE INVENTION

1. Field of the Invention

This invention relates in general to vanes for rotary vane pumps, and in particular to a thermoplastic fiber impregnated rotor vane and method for making the rotor vane.

2. Description of the Prior Art

Rotor vanes for rotary vane pumps, which include compressor pumps, have had various constructions formed by various methods to improve the wear resistance of the vanes. Rotor vanes have been constructed of single materials into shapes which radially extend from rotors of rotary vane pumps to seal against the oval or elliptical shaped walls of pressure chambers. Rubbing of the tips of the rotor vanes along the walls of pressure chambers wears the tips of the vanes, eventually leading to failure of the rotary vane pumps.

There have been numerous attempts to successfully construct rotor vanes of composite materials. An earlier type of rotor vane had a vane tip constructed of fibrous materials impregnated with resinous compounds. Other vanes have been formed by bonding together several layers of woven fabric which are first impregnated with the plastic materials. The layers of woven fabric in this later type of vane construction alternate between layers of plastic material which bond the fabric layers together. The alternating layers of plastic materials and woven fabric results in nonuniform mechanical properties across the transverse thickness of vanes.

Several problems have occurred with prior art rotor vanes. Typically, rotor vane tips formed of fibrous materials impregnated with resinous compounds tend to wear after extended periods of use, causing pump failures. The rotor vanes formed of layers of woven fabric alternating between layers of plastic materials also wear after extended periods of use, and often the layers delaminate due to the varying mechanical properties across the transverse thickness of these later type of vanes.

SUMMARY OF THE INVENTION

A rotor vane and a method for fabricating the rotor vane are provided in which the vane is formed of a thermoplastic matrix material having chopped fibers uniformly dispersed throughout the thermoplastic material, with the fibers aligned to extend in directions which are approximately parallel to a radial dimension in which the vane extends. A billet formed of the thermoplastic matrix material with the chopped fibers randomly oriented and uniformly dispersed within the thermoplastic matrix material is placed in vane forming dies. The dies have an interior surface which is in the shape of the vane. The billet is placed within the dies with the longitudinal length of the billet extending perpendicular to the radial dimension of the vane being formed and completely across the axial dimension of the vane being formed. The billet is heated to a softening temperature and compressed within the dies to deform the billet into the shape of the interior surface of the dies, causing the thermoplastic matrix material to flow in flow directions which are approximately parallel to radial dimension of the vane being formed. Flowing of the thermoplastic matrix material in the flow directions aligns a substantial portion of the fibers with the flow directions, approximately parallel to the radial dimension of the vane. Then the thermoplastic matrix material is cooled to temperature below the softening temperature and the vane is removed from the dies.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is a block diagram depicting a method for fabricating the rotor vane of FIG. 2 from the billet of FIG. 3 in the forming dies of FIGS. 4 and 5.

DETAILED DESCRIPTION OF THE PREFERRED EMBODIMENT

Figure 1:
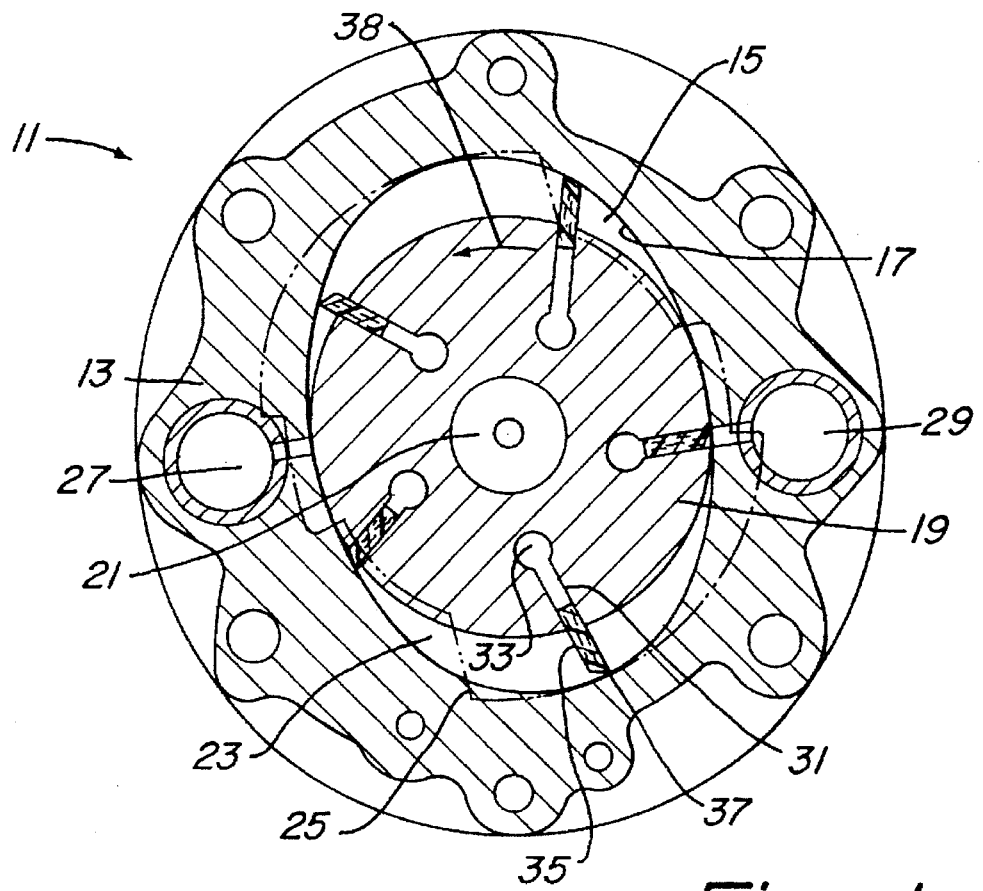
FIG. 1 is a sectional view of a rotary vane pump made according to the present invention, taken in a vertical plane perpendicular to the axis of rotation of the pump rotor.

FIG. 1 is a sectional view of rotary vane pump 11, which in the preferred embodiment is a compressor for compressing a gaseous refrigerant. Rotary vane pump 11 includes housing 13 within which an oblong, and preferably elliptical, pressure chamber 15 is defined by walls 17. Rotor 19 is rotatably mounted within chamber 15, secured to shaft 21 for rotating with shaft 21. Chamber 15 has an inlet 23 defined by a rearward plate 25 mounted to housing 13 to define the rearward end of chamber 15. Outlets 27, 29 extend from chamber 15 through housing 13 for passing compressed refrigerant from chamber 15. Rotary vane pump 11 may be of a similar construction to the vane pump disclosed in U.S. Pat. No. 5,364,235, which issued on Nov. 15, 1994. U.S. Pat. No. 5,364,235 is hereby incorporated by reference as if fully set forth herein.

Rotor 19 has five slots 31 which extend downward to a cavity 33. Five rotor vanes 35 are slidably mounted therein. Vanes 35 have end tips 37 which are pressed against wall 17 of chamber 15 to seal against chamber 15. Vanes 35 extend in a "z" or axial direction, approximately parallel to the axis of shaft 21 and substantially across the length of rotor 19, which extends transverse to the section plane of FIG. 1. Cavities 33 are interconnected and joined with outlets 27, 29 so that discharge pressures within cavities 33 will act in combination with centrifugal force of rotor 19 rotating within chamber 15 to cause vanes 35 to extend outward so that tips 37 seal against wall 17 of chamber 15.

Figure 2:
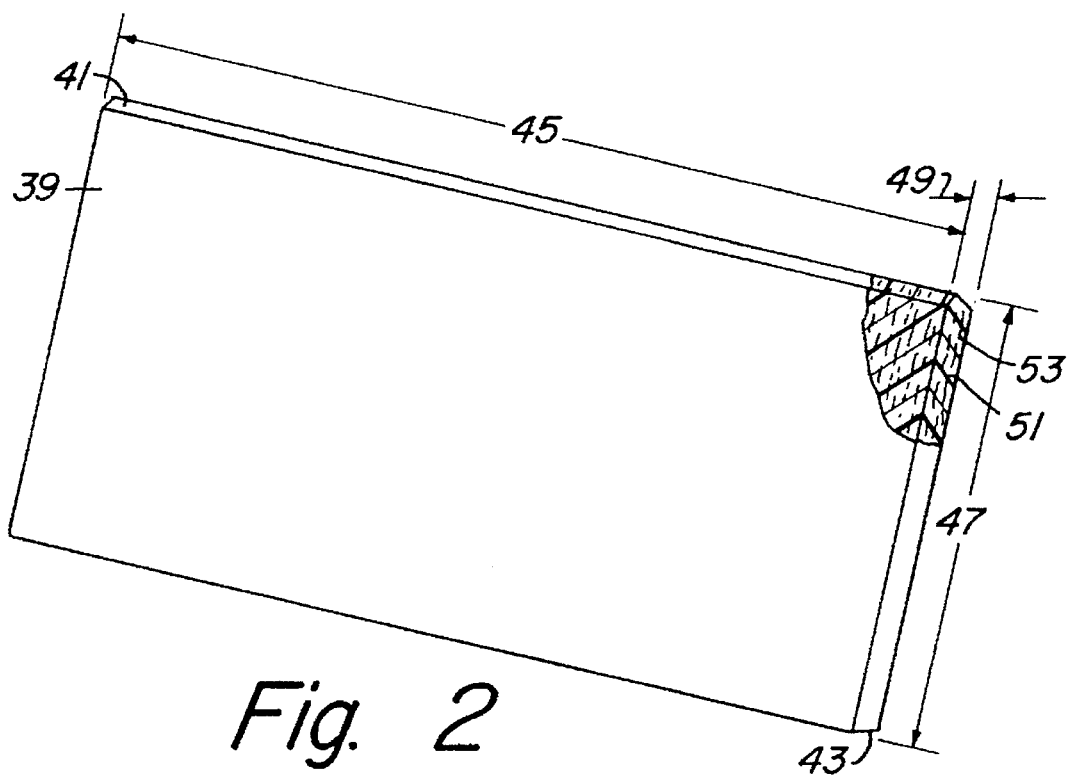
FIG. 2 is a perspective and partial cut-away view of a rotor vane of the rotary vane pump of FIG. 1.

FIG. 2 is a perspective view of vane 39, which is one of vanes 35 (shown in FIG. 1), with a cut-away sectional view on one corner. Vane 39 has a tip 41 on an outward end, and an inner end 43. Vane 39 extends with a "z" or axial dimension 45, in an x-direction with an "x" or radial dimension 47, and in a y-direction with a "y" or transverse dimension 49. Radial dimension 47 and axial dimension 45 are herein defined with respect to vane 39 so that radial dimension 47 defines a radial direction for the vane which extends in the same direction as radial dimension 47. Axial dimension 45 preferably extends perpendicular to radial dimension 47. In some embodiments of the present invention, axial dimension 45 may extend approximately parallel to a central axis of rotation of rotor 19 and shaft 21 when vane 39 is installed within rotor 19.

Vane 39 is formed of a thermoplastic matrix material 51, within which chopped fibers 53 extend in substantially parallel alignment with radial dimension 47. Fibers 53 are aligned to extend substantially parallel to radial dimension 47 when their longest dimensions are aligned to extend parallel to radial dimension 47. In the preferred embodiment, thermoplastic matrix material 51 is polyetheretherkeytone (PEEK) and fibers 53 are carbon fibers having a diameter of 40 to 60 microns (micrometers) and a length of at least one millimeter. The lengths of fibers 53 are substantially smaller than radial dimension 47.

Figure 3:
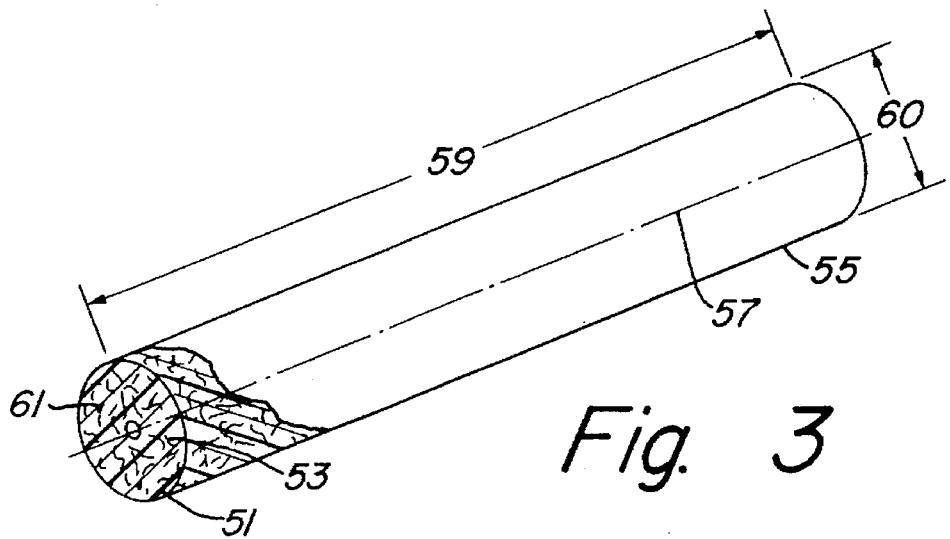
FIG. 3 is a perspective and partial cut-away view of a billet used in forming the rotor vane of FIG. 2.
Figure 4:
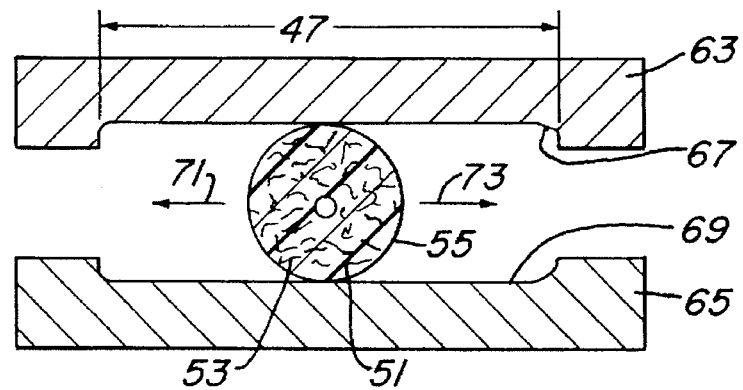
FIG. 4 depicts a sectional view of forming dies used for forming the billet of FIG. 3 into the rotor vane of FIG. 2, taken along a section plane which, with respect to the vane being formed, is parallel to the section plane of FIG. 1.
Figure 5:
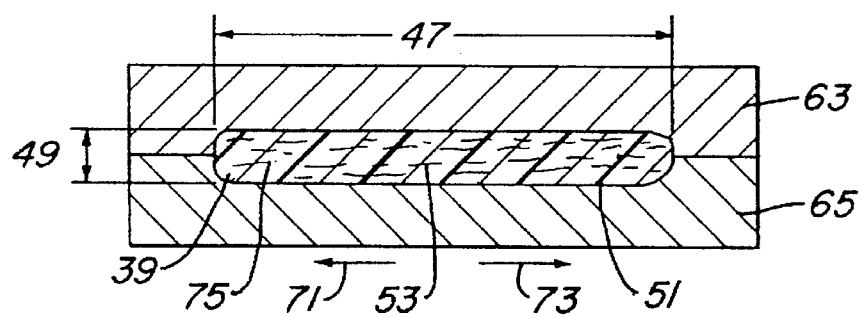
FIG. 5 is a sectional view of the forming dies of FIG. 4, taken along the section plane of FIG. 4 after the forming dies have been pressed together to compress the billet of FIGS. 3 and 4 to form the rotor vane of FIG. 2.

FIGS. 3, 4 and 5 together depict a method for fabricating vane 39. Referring to FIG. 3, a billet 55 is provided which is formed from thermoplastic 51 and has chopped carbon fibers 53 which are randomly oriented and uniformly dispersed throughout thermoplastic 51 of billet 55. Billet 55 preferably has a cylindrical or an elliptical shape. Billet 55 has a longitudinal axis 57 which defines a longitudinal dimension 59. Billet 55 further has a diameter 60 and cross-sectional area 61. It should be noted that diameter 60 for billet 55 is preferably selected so that the cross-sectional area 61 is approximately equal to the transverse sectional area of vane 39, taken along a sectional plane which extends parallel to radial dimension 47 and perpendicular to axial dimension 45.

FIG. 4 is a section view of forming dies 63, 65 for forming billet 55 into the shape of vane 39. A cavity having the shape and dimensions of vane 39 is provided by interior surfaces 67, 69 of forming dies 63, 65, respectively. Billet 55 is placed within forming dies 63, 65 so that billet 55 is centered within the cavity and extends with longitudinal axis 57 of billet 55 parallel to axial dimension 45 (as shown in FIG. 2) of the rotor vane being formed. As dies 63, 65 are pressed together, the thermoplastic material 51 and fibers 53 of billet 55 will flow in flow directions 71, 73, which are parallel to radial dimension 47 of the vane 39 being formed. Preferably, billet 55 has a length 59 which extends the full length of the axial dimension 45 (shown in FIG. 2) of the vane being formed within the cavity of dies 63, 65, so that the thermoplastic material 51 and fibers 53 will only flow in flow directions 71, 73.

FIG. 5 is a sectional view taken perpendicular to axial dimension 45 (shown in FIG. 2) of dies 63, 65 and vane 39 after vane 39 has been formed. Flowing of thermoplastic material 51 and fibers 53 in directions 71, 73 causes fibers 55 to generally align with the length of the fibers extending substantially parallel to radial dimension 47 of vane 39. Vane 39 will then have a sectional area 75, taken along the plane in which FIG. 5 is depicted, which is equal to sectional area 61 of billet 55.

FIG. 6 is a block diagram depicting operations to fabricate vane 39 according to the present invention. Block 81 depicts providing billet 55 formed of thermoplastic matrix material 51 with chopped fibers 53 uniformly dispersed and randomly oriented throughout thermoplastic matrix material 51. Block 83 depicts the step of placing billet 55 into the forming dies 63, 65, with the longitudinal length 55 of billet 55 extending within the forming cavity of dies 63, 65 in the direction in which axial dimension 45 (shown in FIG. 2) of vane 39 will extend upon forming vane 39.

Block 85 depicts the step of heating billet 55 to the softening temperature within the plastic temperature range for the thermoplastic matrix material. At the softening temperature, thermoplastic matrix material 51 will preferably flow when compressed within dies 63, 65 without cracking, yet will retain its shape prior to being compressed between dies 63, 65. For PEEK, this softening temperature is approximately 760 degrees Fahrenhelt.

Block 87 depicts the step of compressing billet 55 within forming dies 63, 65 to flow thermoplastic matrix material 51 in directions 71, 73, which are substantially parallel to radial dimension 47 of vane 39 being formed within dies 63, 65. Block 89 depicts cooling vane 39 to a temperature below the softening temperature so that it may be removed from dies 63, 65 without losing its shape. Then, as depicted in block 91, the formed vane 39 is removed within forming dies 63, 65.

Other thermoplastic matrix materials and fibers may be used in alternative embodiments of the present invention. For example a thermoplastic such as polyimide may be used. Also fibers may be formed of other materials such as glass, or aramid fibers, such as KEVLAR and SPECTRA. Billets may be used with longitudinal lengths which are shorter than the diameters of the billets, typically for embodiments of the present invention in which the radial length of vanes being formed is less than the axial length of the vanes.

Additionally, the term "vanes" as used herein includes also a vane tip manufactured according to the present invention and attached to a vane body which may be made of another material.

The present invention provides several advantages over the prior art. The rotor vanes of the present invention is lighter and less expensive than prior art solid metal vanes. Rotor vanes made according to the present invention are formed of thermoplastic materials which have chopped fibers uniformly distributed and oriented in directions parallel to the radial dimension of the vanes. This provides for greater wear resistance over prior art rotor vanes since the chopped fibers are oriented substantially perpendicular to the directions against which the vane tips are moved against the wall of a pressure chamber. Additionally, vanes made according to the present invention have uniform mechanical properties across the transverse thickness of the vanes so that degradation of vanes, such as delaminating, inward from the terminal ends of vane tips are less likely to occur as a result of mechanical and thermal stresses.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. A method for fabricating vanes for a rotary vane pump having a chamber wall defining a chamber, a rotor having an axis in a longitudinal direction and being rotatably mounted within the chamber, the vanes having a longitudinal dimension, a radial dimension, and a thickness dimension and extending radially outward from the rotor to slidingly engage the chamber wall, the method comprising the steps of:

providing a vane-forming die having two parts which move from an open position to a closed position, the die having a cavity with a longitudinal dimension, a radial dimension and a thickness dimension equal to the corresponding dimensions of the vane when the die is in the closed position;

providing a billet formed of a thermoplastic matrix material and fibers, the billet having a radial dimension which is less than the radial dimension of the die, a thickness dimension which is greater than the thickness dimension of the die, and a longitudinal dimension which is approximately equal to the longitudinal dimension of the die, and the fibers having lengths which are less than the radial dimension of the billet and being randomly oriented within the matrix material;

placing the billet within the die while the die is in the open position and heating the billet to a softening temperature; then, moving the die to the closed position, compressing the billet within the die to deform the billet into the shape of the cavity of the die, thereby causing the radial dimension of the billet to increase, the thickness dimension of the billet to decrease, the longitudinal dimension to remain the same, and causing the fibers to flow and orient in directions parallel to the radial direction so that the billet is formed into a vane; and then, cooling the vane to a temperature below the softening temperature of the matrix material and removing the vane from the die.

2. The method of claim 1, wherein the step of placing the billet within the die further comprises aligning the longitudinal dimension of the billet perpendicular to the radial dimension of the die.

3. The method of claim 1, wherein the step of providing a billet further comprises providing the billet with a radial-transverse cross-sectional area which is approximately equal to a radial-transverse cross-sectional area of the cavity of the die.

4. The method of claim 1, wherein the step of providing a billet further comprises providing the billet with a radial-transverse cross-sectional area which is approximately equal to a radial-transverse cross-sectional area of the cavity of the die, and the step of placing the billet within the die further comprises:

aligning the longitudinal dimension of the billet perpendicular to the radial dimension of the die.

5. The method of claim 1, wherein the step of providing a billet further comprises uniformly distributing the fibers in the billet.

6. The method of claim 1, wherein the step of providing a billet further comprises providing the billet with a cylindrical wall.

7. The method of claim 1, wherein the step of providing a billet further comprises providing the billet with fibers having lengths greater than one millimeter.

8. A method for fabricating vanes for a rotary vane pump of the type having a chamber wall defining a chamber, a rotor having an axis in a z-direction and being rotatably mounted within the chamber, the vanes having an x-dimension in an x-direction which extends outward from the rotor to slidingly engage the chamber wall, the vanes having a y-dimension in a y-direction perpendicular to the x-direction and the z-direction, And a z-dimension parallel to the rotor axis, the method comprising the steps of:

providing a vane-forming die having two halves which register when in a closed position, and a cavity with an x-dimension, a y-dimension and a z-dimension defining the shape of the vanes;

providing a billet formed of a thermoplastic matrix material and fibers, the billet having an x-dimension which is less than the x-dimension in the die, a y-dimension which is greater than the y-dimension of the die, a z-dimension which is approximately equal to the z-dimension of the die, and an x-y cross-sectional area which is approximately equal to an x-y cross-sectional area of the vane, the fibers having lengths which are less than the x-dimension of the billet and being randomly oriented and uniformly distributed within the matrix material;

placing the billet within the die with the z-dimension of the billet aligned perpendicular to the x-dimension of the die and heating the billet to a softening temperature; then, compressing the billet within the die by bringing the two halves together to the closed position to deform the billet into the shape of the cavity of the die, thereby causing the x-dimension of the billet to increase, the y-dimension of the billet to decrease, the z-dimension to remain the same, and the fibers to flow in directions parallel to the x-direction; and then, cooling the matrix material to a temperature below the softening temperature and removing the vane from the die.

9. The method of claim 8, wherein the step of providing a billet further comprises providing the billet with a cylindrical wall.

10. The method of claim 8, wherein the step of providing a billet further comprises providing the billet with fibers having lengths greater than one millimeter.

11. The method of claim 8, wherein the step of providing a billet further comprises providing the billet with a cylindrical wall and fibers having lengths greater than one millimeter.

* * * * *